United States Patent
Frankel et al.

(10) Patent No.: US 10,313,021 B1
(45) Date of Patent: Jun. 4, 2019

(54) HIGH-EFFICIENCY SELF-RESETTING INTEGRATING OPTICAL TRANSCEIVER

(71) Applicant: Ciena Corporation, Hanover, MD (US)

(72) Inventors: Michael Y. Frankel, Bethesda, MD (US); Vladimir Pelekhaty, Baltimore, MD (US)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 15/867,269

(22) Filed: Jan. 10, 2018

(51) Int. Cl.
| | |
|---|---|
| *H04J 14/02* | (2006.01) |
| *H04B 10/61* | (2013.01) |
| *H02J 7/35* | (2006.01) |
| *H02J 7/34* | (2006.01) |
| *G02F 1/225* | (2006.01) |
| *G02F 1/21* | (2006.01) |

(52) U.S. Cl.
CPC .............. *H04B 10/616* (2013.01); *H02J 7/35* (2013.01); *G02F 1/2257* (2013.01); *G02F 2001/212* (2013.01); *H02J 7/345* (2013.01); *H04B 10/613* (2013.01)

(58) Field of Classification Search
CPC .. H04B 10/516; H04B 10/613; H04J 14/0298
See application file for complete search history.

(56) References Cited

U.S. PATENT DOCUMENTS

| | | | |
|---|---|---|---|
| 5,652,767 A | 7/1997 | Kiyonaga et al. | |
| 5,773,815 A | 6/1998 | Stevens | |

(Continued)

FOREIGN PATENT DOCUMENTS

| | | |
|---|---|---|
| EP | 2648360 A1 | 10/2013 |
| WO | 0057582 S1 | 9/2000 |

(Continued)

OTHER PUBLICATIONS

P. Frascella et al., "Transmission of a 288 Gbit/s Ethernet Superchannel over 124 km un-repeatered field-installed SMF," Optical Fiber Communication (OFC), collocated National Fiber Optic Engineers Conference, 2010 Conference on (OFC/NFOEC), OThD2, pp. 1-3, Mar. 21-25, 2010.

(Continued)

*Primary Examiner* — Dzung D Tran
(74) *Attorney, Agent, or Firm* — Clements Bernard Walker PLLC; Christopher L. Bernard; Lawrence A. Baratta, Jr.

(57) ABSTRACT

An optical transceiver includes an optical transmitter configured with data pre-coding to support integrating and resetting functions in a corresponding self-resetting integrating optical receiver; and a self-resetting integrating optical receiver comprising dual photodetectors connected to a capacitor, wherein the dual photodetectors and the capacitor are configured to perform the integrating and resetting functions based on a pre-coded optical input from a corresponding optical transmitter. The data pre-coding can include a 0 differential phase indicative of a 1 bit to set a charge on the capacitor for setting function, $+/-\pi/2$ differential phase indicative of a hold so that the charge on the capacitor is held at a previous value by delivering equal intensity to the dual photodetectors for a holding function, and a $\pi$ differential phase indicative of a 0 bit to reset the charge on the capacitor to zero for resetting function.

20 Claims, 8 Drawing Sheets

(56) References Cited

U.S. PATENT DOCUMENTS

| | | | |
|---|---|---|---|
| 6,243,175 | B1 | 6/2001 | Pelekhaty et al. |
| 7,061,939 | B1 | 6/2006 | Chengson et al. |
| 7,310,459 | B1 | 12/2007 | Rahman |
| 7,512,343 | B2 | 3/2009 | Sridhar et al. |
| 8,437,644 | B2 * | 5/2013 | Zhang .................... H04J 14/02 398/188 |
| 8,498,542 | B2 | 7/2013 | Frankel et al. |
| 2002/0012143 | A1 | 1/2002 | Graves et al. |
| 2003/0076562 | A1 | 4/2003 | Shin et al. |
| 2005/0069240 | A1 * | 3/2005 | Griffin ................... G02B 6/125 385/3 |
| 2006/0024065 | A1 | 2/2006 | Von Lerber |
| 2006/0127100 | A1 | 6/2006 | Frankel et al. |
| 2007/0230625 | A1 * | 10/2007 | Hironishi .............. H04B 10/66 375/329 |
| 2008/0107422 | A1 | 5/2008 | Cole |
| 2009/0022497 | A1 | 1/2009 | Mateosky et al. |
| 2010/0080564 | A1 * | 4/2010 | Fujii ..................... H04B 10/60 398/115 |
| 2011/0013911 | A1 | 1/2011 | Alexander et al. |
| 2011/0142174 | A1 | 6/2011 | Park et al. |
| 2011/0255870 | A1 | 10/2011 | Grigoryan et al. |
| 2012/0039606 | A1 | 2/2012 | Pelekhaty et al. |
| 2012/0044917 | A1 | 2/2012 | O'Keeffe |
| 2012/0213521 | A1 | 8/2012 | Zhang et al. |
| 2012/0321325 | A1 * | 12/2012 | Greshishchev ........ H04B 10/61 398/202 |
| 2013/0128330 | A1 | 5/2013 | Frankel et al. |
| 2013/0209091 | A1 | 8/2013 | Mateosky et al. |
| 2013/0287397 | A1 | 10/2013 | Frankel et al. |
| 2014/0029951 | A1 | 1/2014 | Handelman |
| 2014/0185125 | A1 | 7/2014 | Kanter |
| 2014/0241727 | A1 * | 8/2014 | Lim .................... H04J 14/0298 398/76 |
| 2016/0056896 | A1 * | 2/2016 | Toya .................. H04B 10/5053 398/183 |
| 2016/0182155 | A1 * | 6/2016 | Taylor ................. H04B 10/615 398/208 |
| 2018/0091288 | A1 * | 3/2018 | Zamani ................ H04L 7/0075 |

FOREIGN PATENT DOCUMENTS

| | | | |
|---|---|---|---|
| WO | 2002067521 | A1 | 8/2002 |
| WO | 2008106626 | A1 | 9/2008 |

OTHER PUBLICATIONS

M. Hochberg et al., "Silicon Photonics: the next fabless semiconductor industry," IEEE Solid-State Circuits Magazine, vol. 5, No. 1, pp. 48-58, Mar. 2013.

Monolithic phase-locked loops and clock recovery circuits: theory and design / edited by Behzag Razavi, New York, IEEE Press, 1996.

R. P. Jindal, "Silicon MOS amplifier operation in the integrate and dump mode for gigahertz band lightwave commmunication systems," Journal of Lightwave Technology, vol. 8, No. 7, pp. 1023-1026, Jul. 1990.

S. Sidiropoulus and M. Horowitz, "Current Integrating Receivers for High Speed System Interconnects," IEEE Custom Integrated Circuits Conference—CICC, May 1995.

A. Emami-Neyestanak, et al., "A 1.6Gb/s, 3 mW CMOS Receiver for Optical Communication," Symposium on VLSI Circuits—VLSIC, 2002, pp. 84-88.

A. Emami-Neyestanak, et al., "CMOS Transceiver with Baud Rate Clock Recovery for Optical Interconnects," Symposium on VLSI Circuits—VLSIC, 2004, pp. 410-413.

S. Palermo, et al., "A 90 nm CMOS 16 Gb/s Transceiver for Optical Interconnects," IEEE Journal of Solid-State Circuit, vol. 43, No. 5, pp. 1235-1246, May 2008.

M. Georgas, et al., "Addressing link-level design tradeoffs for integrated photonics interconnects," IEEE Custom Integrated Circuits Conference—CICC, 2011.

M. Georgas, et al. "A monolithically-integrated optical receiver in standard 45-nm SOI," IEEE Journal of Solid-State Circuit, vol. 47, No. 7, pp. 1693-1702, May 2012.

T. D. Gathman and J. F. Buckwalter, "A 45-nm SOI CMOS Integrate-and-Dump Optical Sampling Receiver," IEEE Transactions on Circuits and Systems—I: Regular Papers, vol. 60, No. 2, Feb. 2013.

J. Savoj and B. Razavi, "A CMOS interface circuit for detection of 1.2 Gb/s RZ data," IEEE International Solid-State Circuits Conference, 1999, TP 16.3.

Marvin K. Simon, "Nonlinear analysis of an absolute value type of an early-late gate bit synchronizer," IEEE Transactions on Comm. Technol., vol. COM-18, No. 5, Oct. 1970.

C. R. Giles and J. M. Kahn, "1 Gbit/s integrate-and-dump filter for digital communication systems," Electron. Lett., vol. 25, No. 3, pp. 212-214, 2nd Feb. 1989.

Eduard Säckinger, "TheTransimpedance Limit," IEEE Transactions on Circuits and Systems—I: Regular Papers, vol. 57, No. 8, Aug. 2010.

Broadband optical modulators: science, technology, and applications / edited by Antao Chen and Edmond Murphy, CRC Press, 2012, p. 336.

C. T. DeRose, at al., "Ultra compact 45 GHz CMOS compatible Germanium waveguide photodiode with low dark current," Optics Express, vol. 19, No. 25, pp. 24897-24904, Dec. 5, 2011.

S. Basiri et al., "A 40 Gb/s Transimpedance Amplifier in 65 nm CMOS," Proceedings of IEEE International Symposium on Circuits and Systems, (ISCAS), 2010, pp. 757-760.

S. B. Amid, "Fully differential, 40Gb/s regulated cascade transimpedance amplifier in 0.13 μm SiGe BiCMOS technology,"IEEE Bipolar/BiCMOSCircuits and Technology meeting (BSCTM), 2010, pp. 33-36.

S. T. Chou, S. H. Huang, Z. H. Hong, and W. Z. Chen, "A 40 Gbps Optical Receiver Analog Front-End in 65 nm CMOS", International Symposium on Circuits and Systems (ISCAS), May 2012.

Cheng Li and Samuel Palermo, "A low-power 26-GHz transformer-baased regulated cascade SiGWE BiCMOS transimpedance amplifier," IEEE Journal of Solid-State Circuit, vol. 48, No. 5, pp. 1264-1275, May 2013.

Georgas et al., "Addressing Link-Level Design Tradeoffs for Integrated Photonic Interconnects," IEEE, 2011, pp. 1-8.

Kazi, Khurram, "Elimination of Clock Recovery and Framing by Transporting Clock, Data and Synchronization Pulse for OC-192 Using WDM," Journal of Lightwave Technology, vol. 13, No. 11, Nov. 1995, pp. 1-8.

Miller, David A. B., "Attojoule Optoelectronics for Low-Energy Information Processing and Communications—a Tutorial Review", arXiv:1609.05510 [physics.optics] v3, Jan. 1, 2017, pp. 1-54.

DeRose, Christopher et al., "Ultra compact 45 GHz CMOS compatible Germanium waveguide photodiode with low dark current", 2011 Optical Society of America, Dec. 5, 2011 / vol. 19, No. 25 / Optics Express 24897, pp. 1-8.

Song, Binhuang et al., "Single ring resonator QPSK modulator", SW1N.1.pdf CLEO:2015 © OSA 2015, pp. 1-2.

Gathman, Timothy D. et al., "A 45-nm SOI CMOS Integrate-and-Dump Optical Sampling Receiver", IEEE Transactions on Circuits and Systems—I: Regular Papers, vol. 60, No. 2, Feb. 2013, pp. 469-478.

Säckinger, Edward, "The Transimpedance Limit", IEEE Transactions on Circuits and Systems—I: Regular Papers, vol. 57, No. 8, Aug. 2010, pp. 1848-1856.

\* cited by examiner

HIGH-EFFICIENCY SELF-RESETTING INTEGRATING OPTICAL TRANSCEIVER

FIELD OF THE DISCLOSURE

The present disclosure generally relates to fiber optic systems and methods. More particularly, the present disclosure relates to a high-efficiency self-resetting integrating optical transceiver.

BACKGROUND OF THE DISCLOSURE

Optical links are finding increased use across a number of application spaces, including, for example, chip-chip, board-board, data center/rack-rack, in Wide Area Network (WAN) fiber-optic links, and the like. All of these links and networks are experiencing rapidly increasing growth of capacity. WAN capacity growth is reflected by individual channel data rate scaling from 10 Gbps, to 40 Gbps, to currently deployed 100 Gbps, and to future projections of 1000 Gbps channels. The same capacity growth demand is also observed for shorter interconnects, as demonstrated by active optical cables which currently have >100 Gb of capacity (4×25G, 10×10G, etc.), and are scaling to 400 Gb capacity (16×25G, 8×56G, 40×10G, etc.). Conventional power and real estate concerns arise regarding the analog optoelectronic front end of optical receivers, which typically uses a Transimpedance Amplifier (TIA). TIAs have noise issues and also require a high gain-bandwidth product, which has to increase as the square of the signal bandwidth growth, and hits the so-called "transimpedance limit," Eduard Sackinger, "The Transimpedance Limit," IEEE Transactions on Circuits and Systems—I: Regular Papers, vol. 57, no. 8, August 2010, severely complicating the process of further receiver bandwidth expansion.

An integrate-and-dump receiver with a conventional structure is well known. It requires an electronic reset function on every single input bit, thereby limiting integration time and limiting the achievable data rate. Further, it implies that a robust clock is already available and fully synchronized with the incoming data stream. See, e.g., T. D. Gathman and J. F. Buckwalter, "A 45-nm SOI CMOS Integrate-and-Dump Optical Sampling Receiver," IEEE Transactions on Circuits and Systems—I: Regular Papers, vol. 60, no. 2, February 2013. Also, optical wideband photodetectors are reaching very low capacitance and low dark current, see, e.g., C. T. DeRose, at al., "Ultra compact 45 GHz CMOS compatible Germanium waveguide photodiode with low dark current," Optics Express, vol. 19, no 25, pp. 24897-24904, 5 Dec. 2011. Implementation targets and characteristics of very low power optical links are described in D. A. B. Miller, "Attojoule Optoelectronics for Low-Energy Information Processing and Communications—a Tutorial Review," in arXiv:1609.05510 [physics.optics] 18 Sep. 2016.

Low power optical links are most efficient when using directly modulated lasers, such as Vertical-Cavity Surface-Emitting Lasers (VCSELs). However, this approach is very difficult to implement reliably for tight integration with Application Specific Integrated Circuits (ASICs) due to the substantial heat generated by ASICs and corresponding laser degradation. Solutions with tight ASIC integration have focused on using external Continuous Wave (CW) laser sources positioned in thermally benign environments, and separate modulators tightly coupled to ASICs.

Currently, optical on-chip and chip-to-chip links have been implemented with Non-Return to Zero (NRZ) modulation. This format is well known and is easy to understand and implement. Many options for modulators are available, including Mach-Zehnder Interferometers (MZI), Rings, and Electro-Absorption types. However, NRZ signaling fundamentally wastes 3 dB of optical power, assuming an external CW laser is modulated. Recently, Pulse Amplitude Modulation (PAM4) links have seen development. These actually make overall link power consumption worse, as they require 3× (~5 dB) higher optical power for 2× data rate increase to maintain a fixed link performance.

Receivers are implemented with PIN (p-type, intrinsic, and n-type semiconductor) photodetectors, followed by TIAs to improve receiver sensitivity. Another factor contributing to excessive complexity, real estate, and power dissipation is the TIA-based receiver architecture, which employs a TIA front-end stage facing highly demanding limits of gain-bandwidth product, which has to grow as the square of the signal bandwidth increases (so-called "transimpedance limit"), followed by multiple broadband gain post-TIA stages. It is possible to improve receiver sensitivity using Avalanche photodetectors. But such approaches require high voltages and special photodetector structures, either of which is hard to realize in Complementary Metal-Oxide-Semiconductor (CMOS) technology. Similarly, optical preamplifiers can increase receiver sensitivity, but require a III/V material system separate from CMOS, and are also complex and generally inefficient.

BRIEF SUMMARY OF THE DISCLOSURE

Current-integrating and integrate-and-dump receivers are known in the art (see, e.g., R. P. Jindal, "Silicon MOS amplifier operation in the integrate and dump mode for gigahertz band lightwave communication systems," Journal of Lightwave Technology, vol. 8, no. 7, pp. 1023-1026, July 1990.), and recently are finding some use in data transmission applications. It is well-known that the integrate-and-dump receiver architecture provides a good way to improve receiver sensitivity. What has been missing is a way to implement the "dump" function in an efficient and practically realizable way.

In an embodiment, an optical link includes an optical transmitter configured with data pre-coding to support an integrating and resetting functions in a corresponding self-resetting integrating optical receiver; and the self-resetting integrating optical receiver including dual photodetectors connected to a capacitor, wherein the dual photodetectors and the capacitor are configured to perform the integrating and resetting functions based on a pre-coded optical input from the corresponding optical transmitter. The optical transmitter and the self-resetting integrating optical receiver can be implemented in a Photonic Integrated Circuit (PIC). The data pre-coding can utilize Quaternary Phase Shift Keying (QPSK) and the self-resetting integrating optical receiver can utilize differential phase detection for decoding. The optical transmitter can utilize a phase modulator. The optical transmitter can utilize a dual nested I/Q Mach Zehnder modulator.

The self-resetting integrating optical receiver can further include variable optical attenuators connected to each of the dual photodetectors and a feedback loop connected to the variable optical attenuators for control thereof. The self-resetting integrating optical receiver can further include a delay interferometer connected to the dual photodetectors and configured to receive the pre-coded optical input. The dual photodetectors can be utilized to charge and discharge the capacitor to perform the integrating and resetting functions, based on outputs of the delay interferometer. The optical link can further include a clock forwarding and retiming circuit configured to receive a tap of the pre-coded optical input and provide a clock output which is used to retime an output of the capacitor.

The data pre-coding can include a 0 differential phase indicative of a 1 bit to set a charge on the capacitor for a setting function, +/−π/2 differential phase indicative of a hold so that the charge on the capacitor is held at a previous value by delivering equal intensity to the dual photodetectors for a holding function, and a π differential phase indicative of a 0 bit to reset the charge on the capacity for a resetting function.

The data pre-coding can include an optical pulse transmitted on a first wavelength to set a charge on the capacitor for a setting function, no light indicative of a hold so that the charge on the capacitor is held at a previous value by delivering no pulses to the dual photodetectors for a holding function, and an optical pulse on a second wavelength indicative of a 0 bit to reset the charge on the capacitor for a resetting function, and wherein a wavelength demultiplexer at the self-resetting integrating optical receiver substantially directs the first wavelength to a first photodetector and the second wavelength to a second photodetector.

The data pre-coding can include an optical pulse transmitted on a first waveguide to set a charge on the capacitor for a setting function, no light indicative of a hold so that the charge on the capacitor is held at a previous value by delivering no pulses to the dual photodetectors for a holding function, and an optical pulse on a second waveguide indicative of a 0 bit to reset the charge on the capacitor for a resetting function, and wherein a first waveguide substantially directs the light to a first photodetector and the second waveguide substantially directs light to second photodetector.

In another embodiment, a self-resetting integrating optical receiver includes a delay interferometer configured to receive pre-coded optical input; dual photodetectors configured to receive outputs of the delay interferometer; and a capacitor configured to receive an output of the dual photodetectors, wherein the dual photodetectors and the capacitor are configured to perform an integrating and resetting functions based on the pre-coded optical input from a corresponding optical transmitter. The delay interferometer, the dual photodetectors, and the capacitor can be implemented in a Photonic Integrated Circuit (PIC). The pre-coded optical input can utilize Quaternary Phase Shift Keying (QPSK) and the dual photodetectors and the capacitor utilize differential phase detection for decoding.

The pre-coded optical input can have a 0 differential phase indicative of a 1 bit to set a charge on the capacitor for a setting function, +/−π/2 differential phase indicative of a hold so that the charge on the capacitor is held at a previous value by delivering equal intensity to the dual photodetectors for a holding function, and a π differential phase indicative of a 0 bit to reset the charge on the capacity for a resetting function.

The self-resetting integrating optical receiver can further include variable optical attenuators connected to each of the dual photodetectors and a feedback loop connected to the variable optical attenuators for control thereof. The self-resetting integrating optical receiver can further include a clock forwarding and retiming circuit configured to receive a tap of the pre-coded optical input and provide a clock output which is used to retime an output of the capacitor.

In a further embodiment, a self-resetting integrating optical receiver method includes receiving an optical input with phase modulation from a corresponding optical transmitter; combining the optical input with a delayed version of the optical input; receiving outputs of the combining at dual photodetectors; and charging and discharging a capacitor based on the dual photodetectors to perform integrating and resetting functions.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to a high efficiency self-resetting integrating optical transceiver. Specifically, the optical transceiver is targeted for optical communication links and networks. Again, optical links are finding increased use across a number of shorter-range application spaces, including chip-chip, board-board, and data center/rack-rack. All of these links and networks are experiencing rapidly increasing growth of capacity. Optical links targeting shorter range (<2 km) are critical for the increasingly important data center market, and their capacity growth is reflected by data rate scaling from 10 Gb/s, to 40 Gb/s, to 100 Gb/s, and to current development of >400 Gb/s links. Power consumption is becoming a critical factor and is starting to outweigh other considerations in many designs, either directly or indirectly by defining packaging density, cooling complexity, and cost, etc. An aspect of the self-resetting integrating optical transceiver described herein to improve efficiency, power consumption, and reduce complexity of an optical link implementation for a Photonic Integrated Circuit (PIC) optical interconnect over package level, board level, rack level, and intra building distances (i.e., links without optical amplification).

Figure 1:
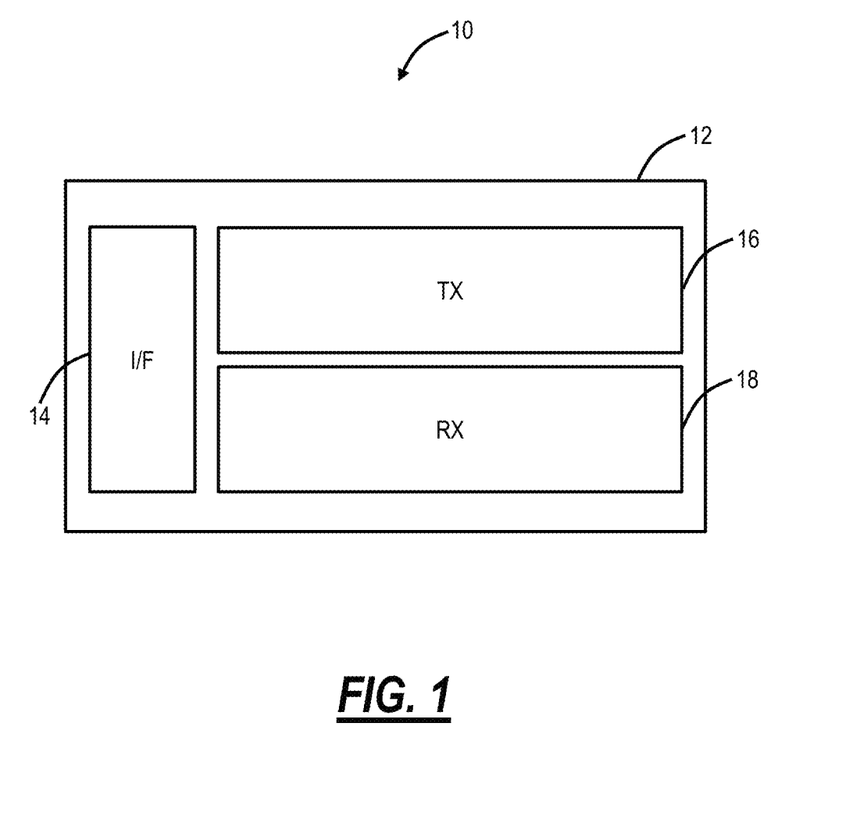
FIG. 1 is a block diagram of a self-resetting integrating optical transceiver of the proposed solution.

FIG. 1 is a block diagram of self-resetting integrating optical transceiver 10 of the proposed solution. The optical transceiver 10 includes a form factor 12, an electrical interface 14, a transmitter (Tx) 16, and a receiver (Rx) 18. In an embodiment, the form factor 12 can be a Photonic Integrated Circuit (PIC) with the electrical interface 14, the transmitter 16, and the receiver 18 formed thereon. In another embodiment, the form factor 12 can be a housing compliant to an MSA (e.g., SFP, XFP, CFP, QSFP, and variants thereof). The electrical interface 14 provides electrical connectivity (data and power) to a host (not shown), and the electrical interface 14 can also be compliant with various interface standards. The transmitter 16 and receiver 18 provide the optical interfaces and are described in detail herein. That is, the transmitter 16 and receiver 18 are part of a self-resetting integrating optical transceiver with high efficiency, low power consumption, and low complexity optical link implementation. In an embodiment, the form factor 12 is a PIC optical interconnect over package level, board level, rack level, and intra building distances (i.e., links without optical amplification).

Aspects of the self-resetting integrating optical transceiver 10 include the following. First, the self-resetting integrating receiver 18 utilizes dual receiver Photo Detectors (PDs) to support the integrating and resetting functions. The integrating receiver 18 includes a self-resetting function, using a transmitted optical signal, which eliminates the usual problem of requiring a recovered clock for efficient "dump" function. The self-resetting integrating receiver 18 utilizes data pre-coding on the transmitter to support correct "1" and "0" integration and a low-speed feedback loop to precisely balance the integrator (prevent run-aways).

In an embodiment, the self-resetting integrating optical transceiver 10 can include a receiver 18 based on differential phase demodulation with balanced optical Photo Detectors (PDs), based on a novel self-resetting integrating approach. If the PDs and CMOS gates are tightly integrated and capacitance is minimized, the self-resetting integrating receiver 18 exhibits much better sensitivity and much lower power consumption compared to a TIA based implementation. Circuit complexity is also substantially reduced.

Variously, laser power consumption, which dominates overall link power, is reduced in the self-resetting integrating optical transceiver 10 due to high receiver sensitivity. Quaternary PSK (QPSK) modulation can be used on the transmitter 16. Depending on modulator configuration, this type of modulation can have zero modulation power loss, potentially saving ~3 dB compared to NRZ and ~6 dB compared to PAM4 formats (at fixed bit rate). These modulators employ efficient binary drivers (linear drivers are much less efficient). If desired, a small low-frequency amplitude modulation can be super-imposed onto QPSK modulation. A small receiver-side power tap can detect this amplitude envelope with small bandwidth low-pass filtering to provide high sensitivity, and therefore deliver clean clock forwarding from transmitter to receiver. Other embodiments are also contemplated to provide separate integrate and reset functions based on separate optical waveguides, Wavelength Division Multiplexing (WDM), Polarization Multiplexing (PM), Fiber modes, etc.

The modulation on the transmitter 16 requires QPSK type format precoding, but the decoding is still Differential Phase with a single demodulator. QPSK is a form of phase modulation that conveys data by changing the phase of the carrier wave. The modulation can be as follows: a 0 differential phase indicates a "1" bit, i.e., "setting" capacitor charge (similar to "integration" in integrate-and-dump receiver), +/−π/2 differential phase indicate hold, i.e., capacitor charge is held at previous value by delivering equal intensity to both detectors ("holding"), and π differential phase indicates a "0" bit, i.e., "resetting" capacitor charge (similar to "dump" in integrate-and-dump receiver).

Figure 2:
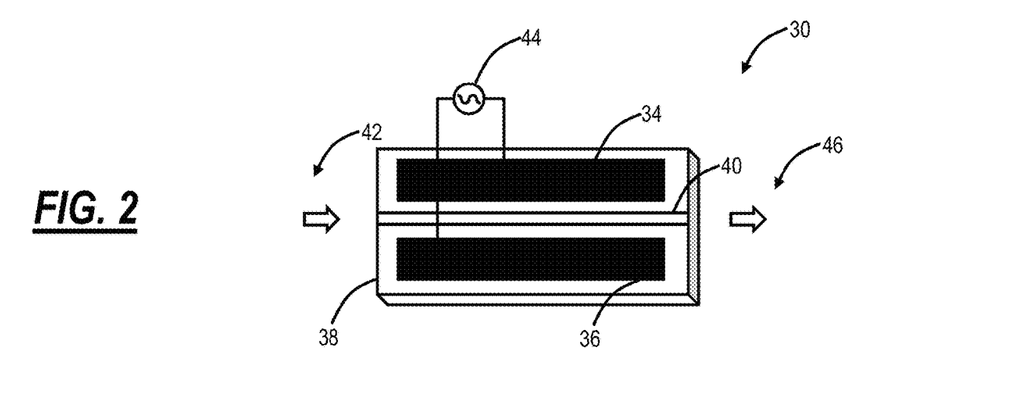
FIG. 2 is a diagram of a pure PSK modulator for the transmitter in the optical transceiver of FIG. 1.
Figure 3:
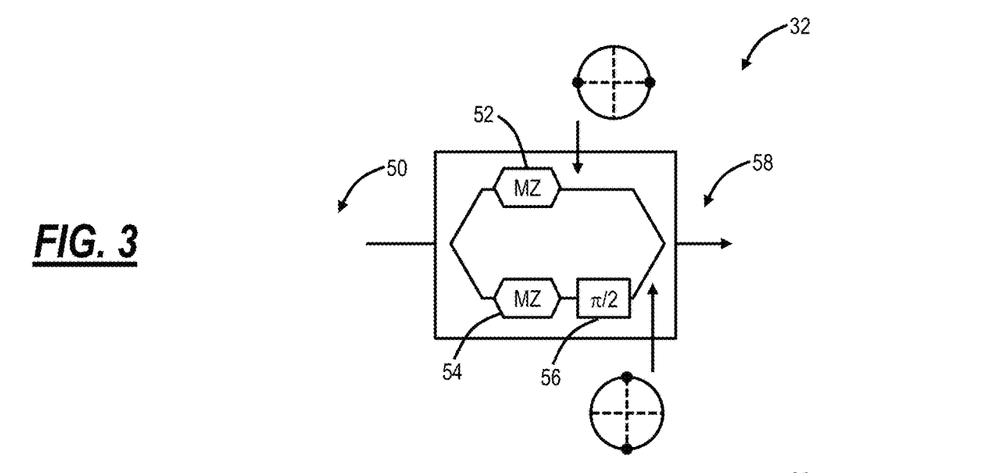
FIG. 3 is a diagram of a nested In-phase/Quadrature (I/Q) Mach-Zehnder modulator for the transmitter in the optical transceiver of FIG. 1.

FIG. 2 is a diagram of a pure PSK modulator 30 for the transmitter 16 and FIG. 3 is a diagram of a nested In-phase/Quadrature (I/Q) Mach-Zehnder modulator 32 for the transmitter 16. In an embodiment, the transmitter 16 can be based on a pure phase modulator such as the PSK modulator 30. The PSK modulator 30 includes electrodes 34, 36 on an electro-optic material 38 with an optical waveguide 40 between the electrodes 34, 36. Light 42 is input to the optical waveguide 40 and modulated based on a signal 44 applied to the electrodes 34, 36 to form an output signal 46. The advantage of this approach is a small optical loss, with a drawback requiring accurate voltage level controls. However, tight integration of electronic and photonic components could mitigate this drawback. A pure phase modulator can be implemented as a waveguide or as a ring-type modulator.

In another embodiment, the transmitter 16 can be based on a dual nested I/Q Mach-Zehnder (MZ) modulator 32. The MZ modulator 32 includes input light 50 split to two MZ interferometers (MZI) 52, 54 with a phase shifter 56 which phase shifts the light phase modulated by the MZI 54 by π/2. The light phase modulated by both of the MZIs 52, 54 is recombined to provide a phase modulated output 58. The MZ modulator 32 is a robust solution, with a drawback of increased optical complexity and a 3 dB optical loss due to the combiner following the MZIs 52, 54.

Figure 4:
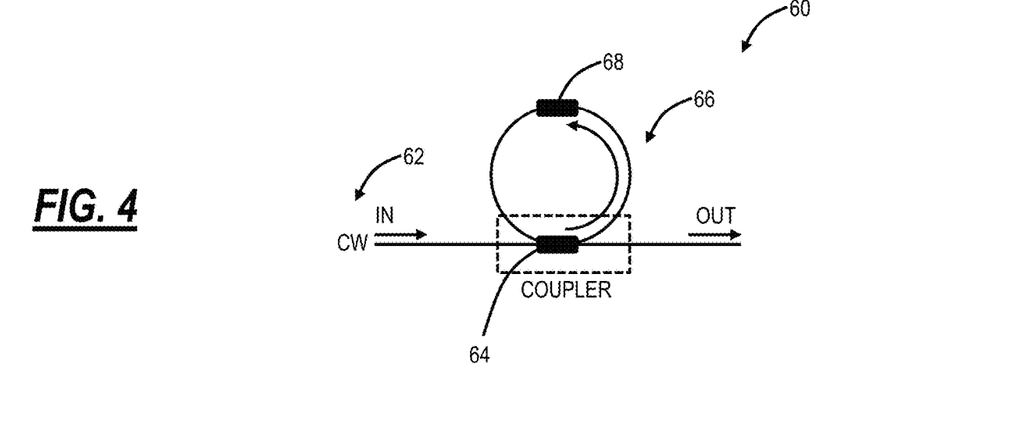
FIG. 4 is a diagram of a dual-driven ring modulator for the transmitter.

FIG. 4 is a diagram of a dual-driven ring modulator 60 for the transmitter 16. The dual-driven ring modulator 60 includes input light 62 such as from a CW source which is connected to a coupler 64 forming a ring modulator 66. The ring modulator 66 includes a phase modulator 68. Details of the dual-driven ring modulator 60 are described in Song, Binhuang, et al. "Single ring resonator QPSK modulator." Lasers and Electro-Optics (CLEO), 2015 Conference on. IEEE, 2015, the contents of which are incorporated by reference herein.

Figure 5:
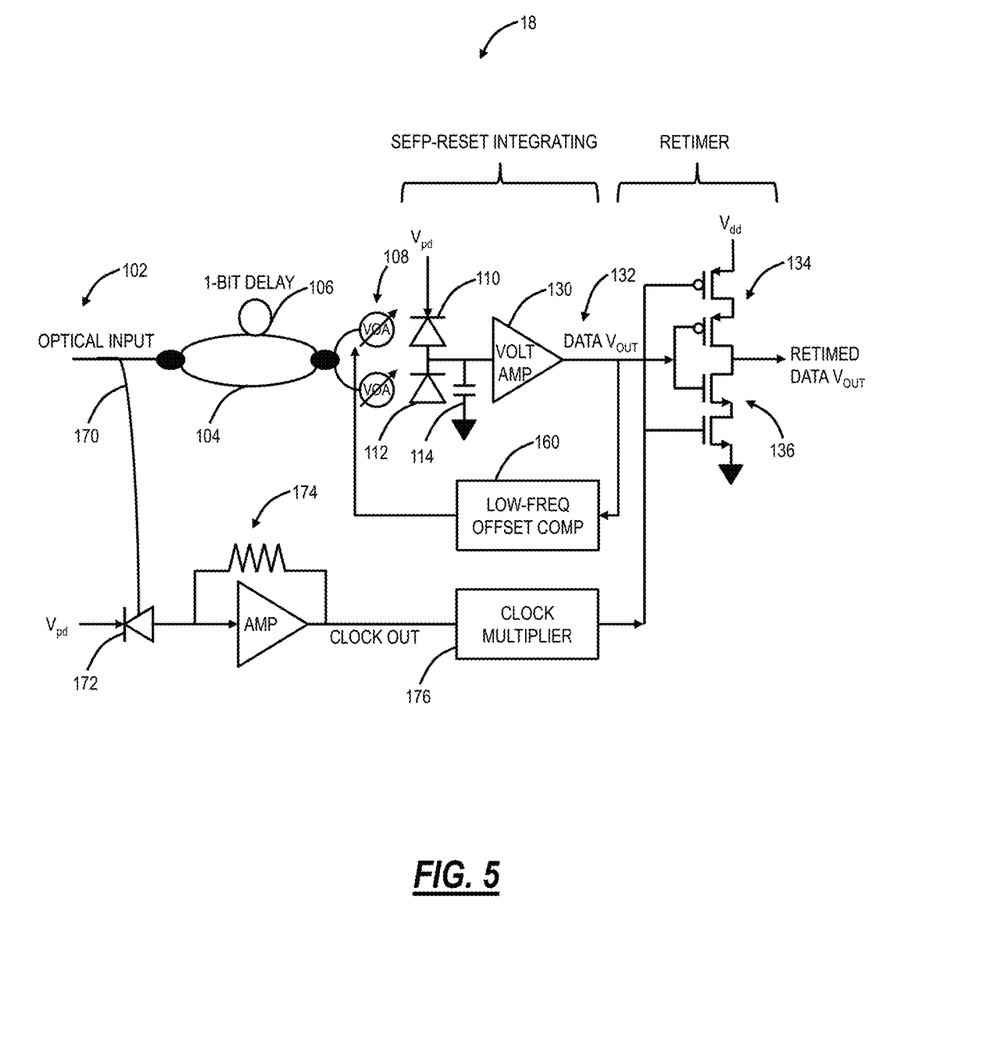
FIG. 5 is a diagram of an implementation of the self-resetting integrating receiver.

FIG. 5 is a diagram of one embodiment of the integrating receiver 18. An important aspect of the integrating receiver 18 is the self-resetting function (i.e., every successive integrated pulse is automatically "dumping" the result of integration of the previous pulse), which is actuated by the proper precoding and modulation of the transmitted signal. The Low-frequency feedback level balancer is also an important aspect.

The receiver 18 includes a pre-coded optical input 102, from the transmitter 16, input to a delay interferometer 104 with an approximate one-bit delay 106 imbalance between the arms. The delay interferometer 104 produces two optical outputs which can be connected to Variable Optical Attenuators (VOAs) 108 prior to photodetectors 110, 112, with an example optical powers as shown in FIG. 6 (shown for an ideal square optical pulse at the transmitter 16).

The delay interferometer 104 provides two outputs each to one of the photodetectors 110, 112 and is used to determine whether a next bit is the same or different from a previous bit. That is, the delay interferometer 104 in combination with the photodetectors 110, 112 determines the pre-coded optical input 102.

The receiver 18 advantageously includes a capacitor 114 in the self-resetting integrating configuration instead of a resistor which converts current to voltage and is noise generating. The capacitor 114 can be small, integrated in the PIC, and generates no noise. The optical input 102 is pre-coded at the transmitter 16 for the integrating and resetting functions.

Figure 6:
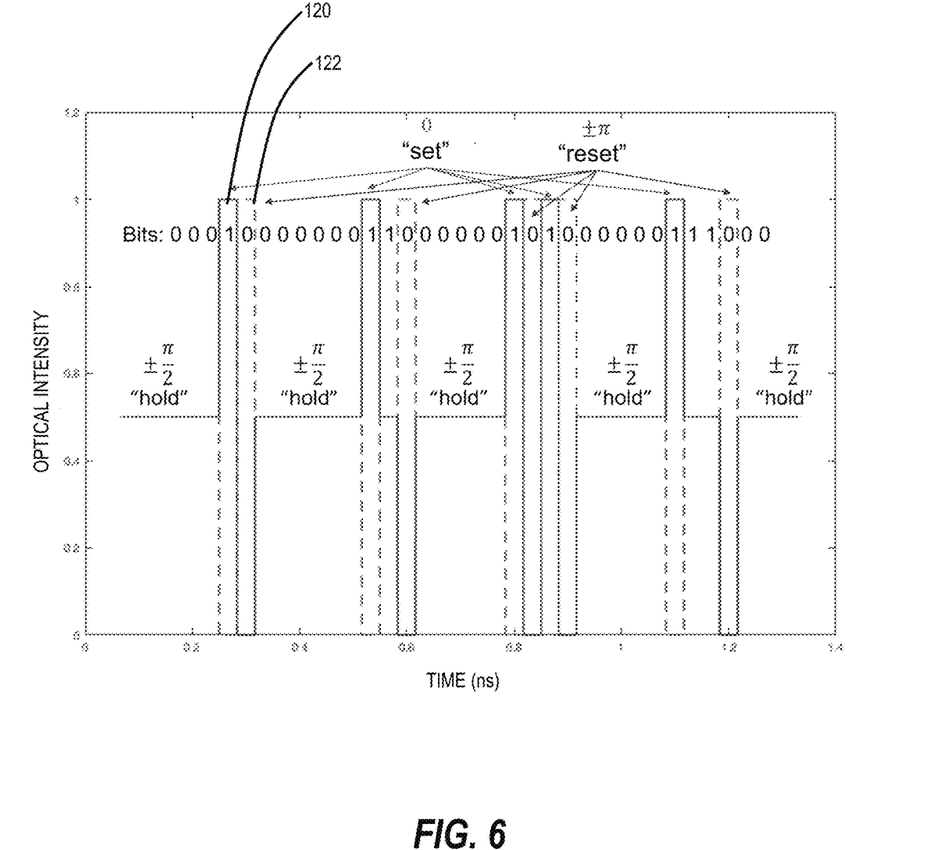
FIG. 6 is a graph of an example of an output of the delay interferometer in the self-resetting integrating receiver over time.

FIG. 6 is a graph of an example of an output of the delay interferometer 104 over time. A "set" pulse 120 (designated by a solid line) is incident on the upper photodetector 110 to produce a positive 1 pulse on the "first 1 bit" of a set of several consecutive "1 bits" and a 0.5 level on "Hold 1" when there are several consecutive "1 bits" and 0 pulse on the "first 0 bit" of set of several consecutive "0 bits". Thus, the initial optical "set" pulse 120 charges the capacitor 114, which then holds this charge until a "reset" pulse 122 arrives.

The "reset" pulse 122 (designated by a dashed line) is incident on the lower photodetector 112 to produces a positive 1 pulse on the "first 0 bit" of a set of several consecutive "0 bits" and a 0.5 level on the "Hold 0" when there is several consecutive "0 bits," and 0 pulse on "first 1 bit" of a set of several consecutive "1 bits". Thus, the initial optical "reset" pulse 122 discharges the capacitor 114, which then holds no charge until a "set" pulse 120 arrives.

Figure 7:
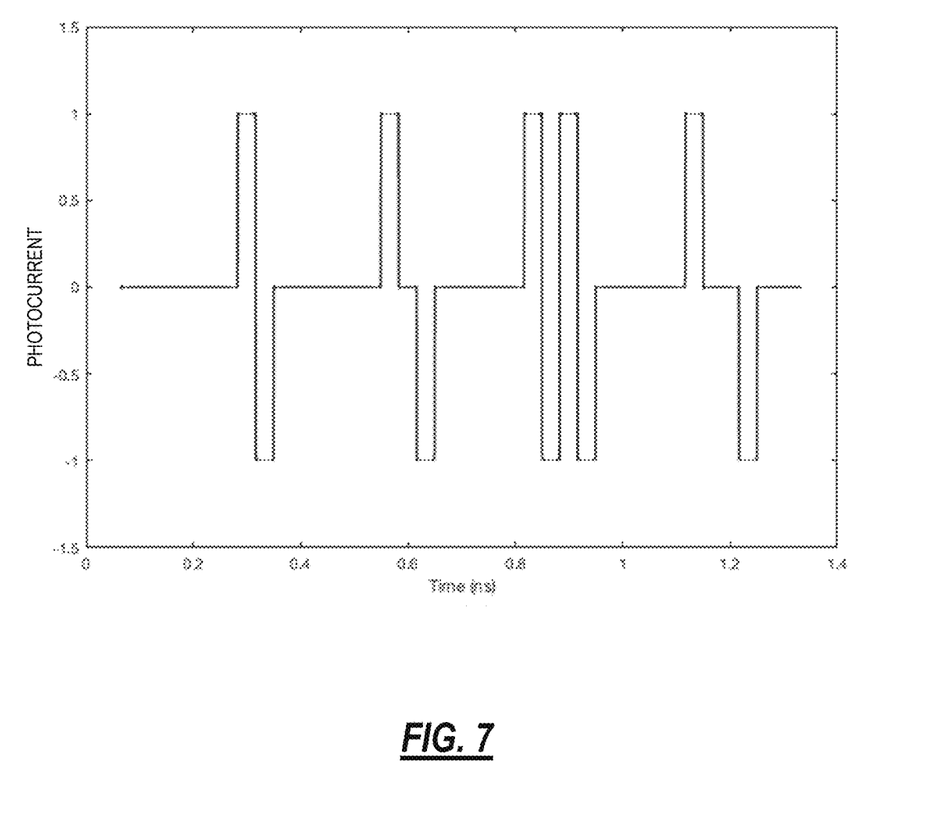
FIG. 7 is a graph of current based on the optical intensity from the photodetectors into the capacitor.

Since both of the photodetectors 110, 112 provide complementary current into the integrating capacitor 114, the current into the capacitor 114 has the following form, shown in FIG. 7 which is a graph of photocurrent based on the optical intensity from the photodetectors 110, 112 into the capacitor 114. A positive 1 pulse charges the capacitor 114 and sets a "1" level for subsequent bit decisions, while a zero level provides a hold signal for consecutive "1 bits." A negative 1 pulse discharges the capacitor 114 and sets a "0" level for subsequent bit decisions, while a zero level provides a hold signal for consecutive "0 bits."

Figure 8:
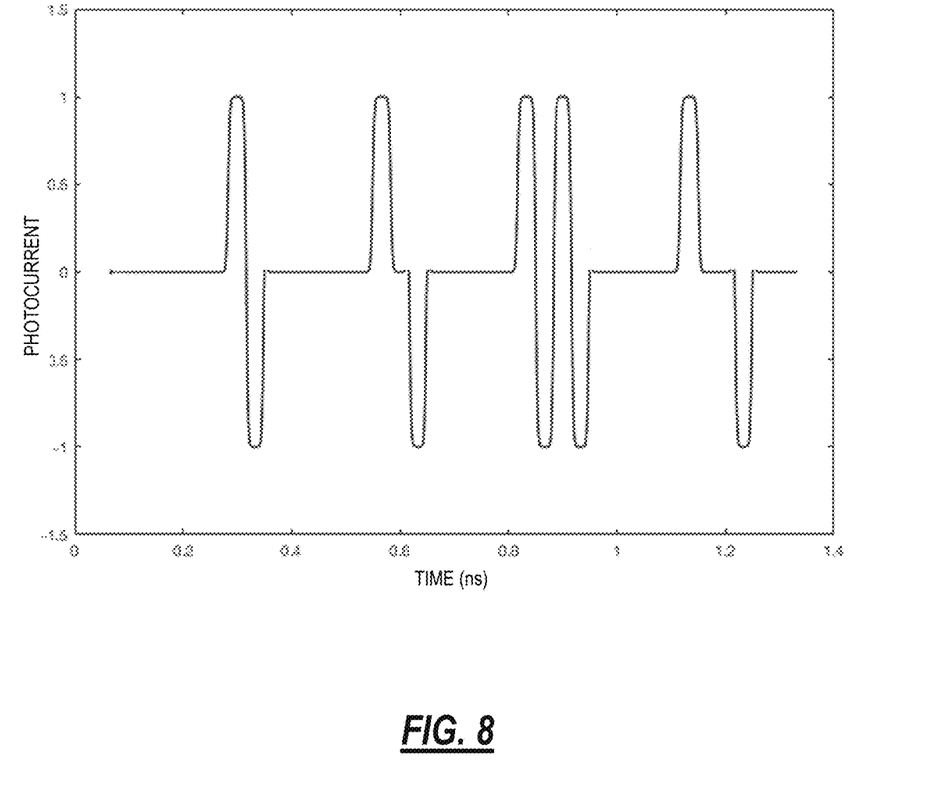
FIG. 8 is a graph of a more realistic band-limited signal, relative to FIG. 7, producing qualitatively similar waveforms.

FIG. 7 is shown for ideal square pulses, and FIG. 8 is a graph of a more realistic band-limited signal producing qualitatively similar waveforms.

Returning to FIG. 5, the capacitor 114 is connected to a voltage amplifier 130 which provides a data out electrical signal, $V_{OUT}$ 132, to two transistor gates 134, 136 configured to retime the data out an electrical signal, $V_{OUT}$ 132, to provide retimed data, $V_{OUT}$.

The equivalent circuit includes two current sources, corresponding to the two photodetectors 110, 112, operating in a complementary fashion. The integrating capacitance is a parallel (i.e., additive) combination of the two photodetectors 110, 112 capacitances, the two transistor gate 134, 136 capacitances, and interconnect parasitics. An efficient photodetector can have a capacitance of ~2 fF. Typical CMOS gate capacitance is 0.350 fF. Therefore, total integrator capacitance can be approximated as ~5 fF.

Figure 9:
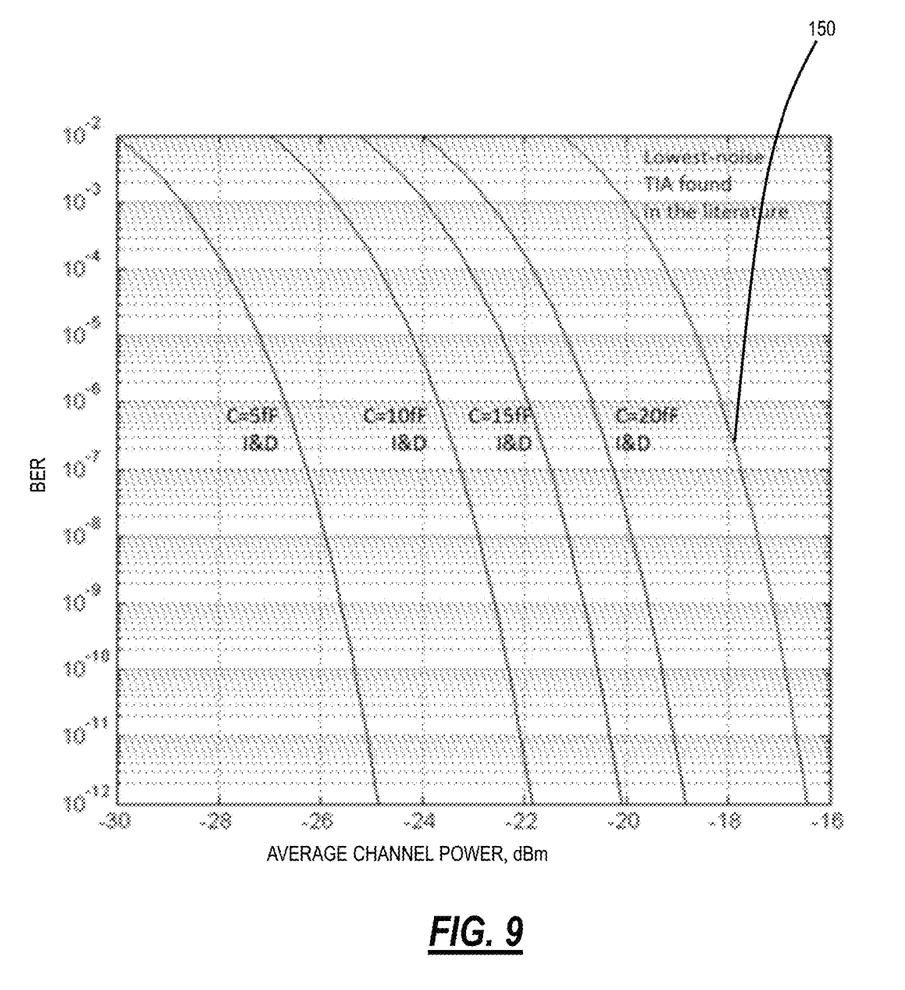
FIG. 9 is a graph of Bit Error Rate (BER) versus average optical channel power for the self-resetting integrating receiver 18 with different capacitances (from left to right is 5 fF, 10 fF, 15 fF, and 20 fF) and a TIA receiver.

Given a fixed laser power, a QPSK transmitter 16 based on a phase modulator transmits ~3 dB more optical power compared to an NRZ transmitter, and the DPSK receiver 18 provides better receiver sensitivity assuming voltage amplifier 130 noise as in a conventional receiver. However, the proposed self-resetting integrating structure reduces intrinsic receiver noise by removing TIA transimpedance and replacing it with integrating Capacitance. Gains of ~10 dB or more can be observed, given a sufficiently small capacitor 114, as shown in FIG. 9. Specifically, FIG. 9 is a graph of Bit Error Rate (BER) versus average optical channel power for the integrating receiver 18 with different capacitances (from left to right is 5 fF, 10 fF, 15 fF, and 20 fF) and a TIA receiver 150.

The self-resetting integrating 18 operation depends on eliminating imbalanced operation. Any imbalance will be integrated into a gradually growing offset, which will produce increased bit errors and possibly saturate the receiver 18.

Given the integrated circuit nature of the proposed transceiver 10, any imbalance will be small. However, it can never be completely negligible, and effects such as differences in optical modulation, photodetector responsivity, and photodetector dark and circuit leakage currents must be compensated. To compensate, the receiver 18 can make use of the fact that such offsets will be small accumulated errors and be spread over many data bits. With reference to FIG. 5, the receiver 18 can include a monitor output of the voltage amplifier 130 within a substantially linear gain chain (i.e., before decision slicing) to estimate average offset, and to feed an error signal back via a low-frequency offset compensator 160 to control the VOAs 108.

While the output of the integrating receiver is an NRZ waveform and perfectly eligible for standard CDR procedures applicable to NRZ format, the receiver 18 also may include clock forwarding and retiming, which is required for conventional integrate-and-dump receivers. The clock forwarding and retiming includes a fractional tap 170 which extracts a portion of the optical input 120. This signal can be quite weak, considering the narrow bandwidth characteristics of the clock receiver. Therefore, clock recovery and data retiming circuitry can be substantially simplified, and data retiming can be performed very easily and with low power. Again, the photonic integrated nature of the circuit assures that clock and data signals are well aligned after detection.

For example, the clock forwarding and retiming can include a photodetector 172 receiving the fractional tap 170. An electrical output of the photodetector 172 is input to a narrow-bandwidth TIA 174 for clock extraction. The TIA 174 provides an output clock to a clock multiplier 176 which adjusts the output clock which is provided as inputs to the transistors 134, 136 along with the $V_{OUT}$ 132. For example, the transmitter 16 can super-impose a small low-frequency amplitude modulation onto a QPSK modulated signal. The small receiver-side power fractional tap 170 can detect this amplitude envelope with small bandwidth low-pass filtering to provide high sensitivity, and therefore deliver clean clock forwarding from transmitter 16 to receiver 18.

In an embodiment, the optical transceiver 10 includes the optical transmitter 16 configured with data pre-coding to support an integrating and resetting functions in a corresponding self-resetting integrating optical receiver 18; and an integrating optical receiver including dual photodetectors 110, 112 connected to a capacitor 114, wherein the dual photodetectors 110, 112 and the capacitor 114 are configured to perform the integrating and resetting functions based on a pre-coded optical input 102 from a corresponding optical transmitter 16. The optical transmitter 16 and the integrating optical receiver 18 can be implemented in Photonic Integrated Circuits (PIC).

The data pre-coding can utilize Quaternary Phase Shift Keying (QPSK) and the integrating optical receiver utilizes differential phase detection for decoding. The data pre-coding include a 0 differential phase indicative of a 1 bit to set a charge on the capacitor for a setting function, +/−π/2 differential phase indicative of a hold so that the charge on the capacitor is held at a previous value by delivering equal intensity to the dual photodetectors for a holding function, and a π differential phase indicative of a 0 bit to reset the charge on the capacity for a resetting function.

The data pre-coding can include an optical pulse transmitted on a first wavelength to set a charge on the capacitor for a setting function, no light indicative of a hold so that the charge on the capacitor is held at a previous value by delivering no light to the dual photodetectors for a holding function, and an optical pulse on a second wavelength indicative of a 0 bit to reset the charge on the capacitor for a resetting function, and wherein a wavelength demultiplexer at the self-resetting integrating optical receiver substantially directs the first wavelength to a first photodetector and the second wavelength to a second photodetector.

The data pre-coding can include an optical pulse transmitted on a first waveguide to set a charge on the capacitor for a setting function, no light indicative of a hold so that the charge on the capacitor is held at a previous value by delivering no light to the dual photodetectors for a holding function, and an optical pulse on a second waveguide indicative of a 0 bit to reset the charge on the capacitor for a resetting function, and wherein a first waveguide substantially directs the light to a first photodetector and the second waveguide substantially directs light to second photodetector.

The optical transmitter 16 can utilize a phase modulator or a dual nested I/Q Mach Zehnder modulator. The self-resetting integrating optical receiver can further include a delay interferometer 104 connected to the dual photodetectors 110, 112 and configured to receive the pre-coded optical input 102. The self-resetting integrating optical receiver 18 can further include variable optical attenuators 108 connected to each of the dual photodetectors 110, 112 and a feedback loop connected to the variable optical attenuators 108 for control thereof. The dual photodetectors 110, 112 are utilized to charge and discharge the capacitor 114 to perform the integrating and resetting functions, based on outputs of the delay interferometer 104. The dual photodetectors 110, 112 are utilized to charge and discharge the capacitor 114 to perform the integrating and resetting functions. The optical transceiver 10 can further include a clock forwarding and retiming circuit configured to receive a tap 170 of the pre-coded optical input 102 and provide a clock output which is used to retime an output of the capacitor 114.

Figure 10:
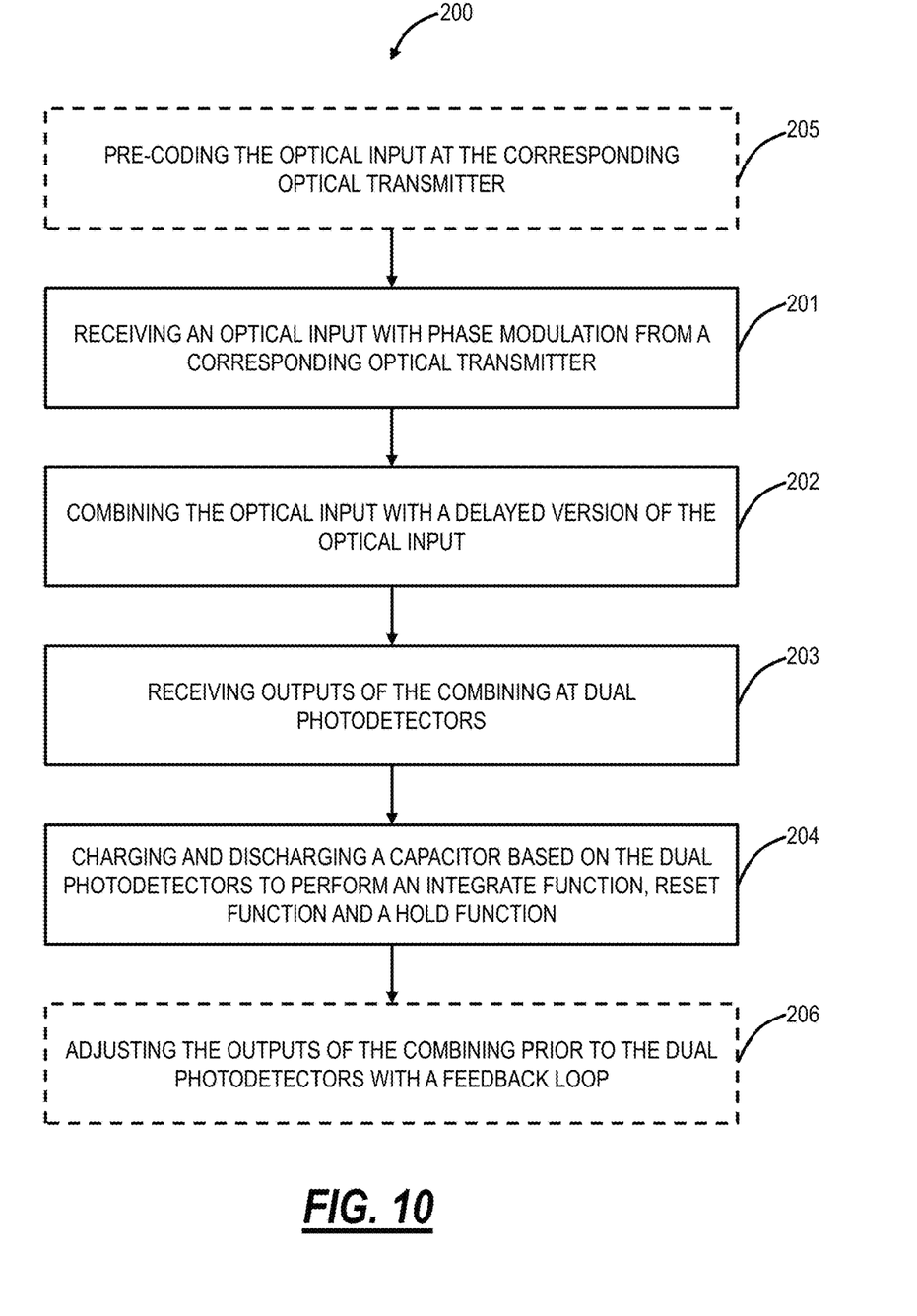
FIG. 10 is a flowchart of a self-resetting integrating optical receiver process.

FIG. 10 is a flowchart of a self-resetting integrating optical receiver process 200. The process 200 includes receiving an optical input with phase modulation from a corresponding optical transmitter (step 201); combining the optical input with a delayed version of the optical input (step 202); receiving outputs of the combining at dual photodetectors (step 203); and charging and discharging a capacitor based on the dual photodetectors to perform an integrating and resetting functions (step 204).

The process 200 can further include pre-coding the optical input at the corresponding optical transmitter (step 205). The pre-coding can include a 0 differential phase indicative of a 1 bit to set a charge on the capacitor for "setting", $+/-\pi/2$ differential phase indicative of a hold so that the charge on the capacitor is held at a previous value by delivering equal intensity to the dual photodetectors for a "holding", and a $\pi$ differential phase indicative of a 0 bit to reset the charge on the capacitor to zero for "resetting." The process 200 can further include adjusting the outputs of the combining prior to the dual photodetectors with a feedback loop (step 206).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical link, comprising
   an optical transmitter configured with data pre-coding to support an integrating and resetting functions in a corresponding self-resetting integrating optical receiver; and
   the self-resetting integrating optical receiver comprising dual photodetectors connected to a capacitor, wherein the dual photodetectors and the capacitor are configured to perform the integrating and resetting functions based on a pre-coded optical input from the corresponding optical transmitter,
   wherein the data pre-coding includes a 0 differential phase indicative of a 1 bit to set a charge on the capacitor for a setting function, $+/-\pi/2$ differential phase indicative of a hold so that the charge on the capacitor is held at a previous value by delivering equal intensity to the dual photodetectors for a holding function, and a $\pi$ differential phase indicative of a 0 bit to reset the charge on the capacitor to zero for a resetting function.

2. The optical link of claim 1, wherein the optical transmitter and the self-resetting integrating optical receiver are implemented in a Photonic Integrated Circuit (PIC).

3. The optical link of claim 1, wherein the data pre-coding utilizes Quaternary Phase Shift Keying (QPSK) and the self-resetting integrating optical receiver utilizes differential phase detection for decoding.

4. The optical link of claim 1, wherein the optical transmitter utilizes a phase modulator.

5. The optical link of claim 1, wherein the optical transmitter utilizes a dual nested I/Q Mach Zehnder modulator.

6. The optical link of claim 1, wherein the self-resetting integrating optical receiver further comprises variable optical attenuators connected to each of the dual photodetectors and a feedback loop connected to the variable optical attenuators for control thereof.

7. The optical link of claim 1, wherein the self-resetting integrating optical receiver further comprises a delay interferometer connected to the dual photodetectors and configured to receive the pre-coded optical input.

8. The optical link of claim 7, wherein the dual photodetectors are utilized to charge and discharge the capacitor to perform the integrating and resetting functions, based on outputs of the delay interferometer.

9. The optical link of claim 1, wherein the dual photodetectors are utilized to charge and discharge the capacitor to perform the integrating and resetting functions.

10. The optical link of claim 1, further comprising
a clock forwarding and retiming circuit configured to receive a tap of the pre-coded optical input and provide a clock output which is used to retime an output of the capacitor.

11. A self-resetting integrating optical receiver, comprising
a delay interferometer configured to receive a pre-coded optical input;
dual photodetectors configured to receive outputs of the delay interferometer; and
a capacitor configured to receive an output of the dual photodetectors, wherein the dual photodetectors and the capacitor are configured to perform an integrating and resetting functions based on the pre-coded optical input from a corresponding optical transmitter,
wherein the pre-coded optical input has a 0 differential phase indicative of a 1 bit to set a charge on the capacitor for a setting function, +/−π/2 differential phase indicative of a hold so that the charge on the capacitor is held at a previous value by delivering equal intensity to the dual photodetectors for a holding function, and a π differential phase indicative of a 0 bit to reset the charge on the capacitor to zero for a resetting function.

12. The self-resetting integrating optical receiver of claim 11, wherein the delay interferometer, the dual photodetectors, and the capacitor are implemented in a Photonic Integrated Circuit (PIC).

13. The self-resetting integrating optical receiver of claim 11, wherein the pre-coded optical input utilizes Quaternary Phase Shift Keying (QPSK) and the dual photodetectors and the capacitor utilize differential phase detection for decoding.

14. The self-resetting integrating optical receiver of claim 11, further comprising
variable optical attenuators connected to each of the dual photodetectors and a feedback loop connected to the variable optical attenuators for control thereof.

15. The self-resetting integrating optical receiver of claim 11, further comprising
a clock forwarding and retiming circuit configured to receive a tap of the pre-coded optical input and provide a clock output which is used to retime an output of the capacitor.

16. A self-resetting integrating optical receiver, comprising
a delay interferometer configured to receive a pre-coded optical input;
dual photodetectors configured to receive outputs of the delay interferometer; and
a capacitor configured to receive an output of the dual photodetectors, wherein the dual photodetectors and the capacitor are configured to perform an integrating and resetting functions based on the pre-coded optical input from a corresponding optical transmitter,
wherein the data pre-coding includes an optical pulse transmitted on a first wavelength to set a charge on the capacitor for a setting function, no light indicative of a hold so that the charge on the capacitor is held at a previous value by delivering no light to the dual photodetectors for a holding function, and an optical pulse on a second wavelength indicative of a 0 bit to reset the charge on the capacitor for a resetting function, and
wherein one of i) a wavelength demultiplexer at the self-resetting integrating optical receiver substantially directs the first wavelength to a first photodetector and the second wavelength to a second photodetector and ii) a first waveguide substantially directs the light to a first photodetector and the second waveguide substantially directs the light to a second photodetector.

17. The self-resetting integrating optical receiver of claim 16, wherein the optical transmitter and the self-resetting integrating optical receiver are implemented in a Photonic Integrated Circuit (PIC).

18. The self-resetting integrating optical receiver of claim 16, wherein the data pre-coding utilizes Quaternary Phase Shift Keying (QPSK) and the self-resetting integrating optical receiver utilizes differential phase detection for decoding.

19. The self-resetting integrating optical receiver of claim 16, wherein the optical transmitter utilizes a phase modulator.

20. The self-resetting integrating optical receiver of claim 16, wherein the optical transmitter utilizes a dual nested I/Q Mach Zehnder modulator.

* * * * *